May 4, 1926.

D. S. DE LAVAUD 1,583,532

POWER TRANSMISSION MECHANISM

Filed July 7, 1924

Inventor.
Dimitri Sensaud de Lavaud
by H. J. S. Dennison atty.

Patented May 4, 1926.

1,583,532

UNITED STATES PATENT OFFICE.

DIMITRI SENSAUD DE LAVAUD, OF PARIS, FRANCE.

POWER-TRANSMISSION MECHANISM.

Application filed July 7, 1924. Serial No. 724,609.

*To all whom it may concern:*

Be it known that I, DIMITRI SENSAUD DE LAVAUD, a citizen of the United States of Brazil, and resident of the city of Paris, in the Republic of France, have invented certain new and useful Improvements in a Power-Transmission Mechanism, as described in the following specification and illustrated in the accompanying drawings, that form part of the same.

The principal objects of the present invention are, to transmit a given force from a driving member to a driven member at variable speeds and values without disconnecting and driving from the driven member at any period and to enable a very wide range of speed ratio between said members.

The principal feature of the invention consists in the novel manner of transforming periodic movements of fixed amplitude into periodic movements of variable amplitude and variable values through a free wheel clutch operated by a link connected to a lever pivoted to a connecting rod driven by the driving member, said lever having a variable pivot support whereby a variation in the range of movement of the lever is effected.

Figure 1:
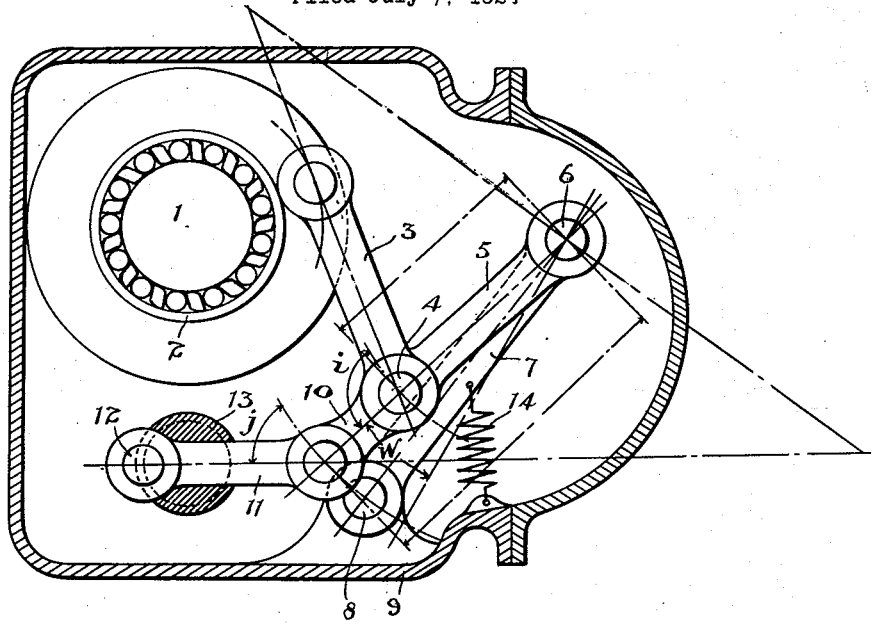

In the drawings, Figure 1 is a sectional diagram illustrating one method of application of my invention.

Figure 2:
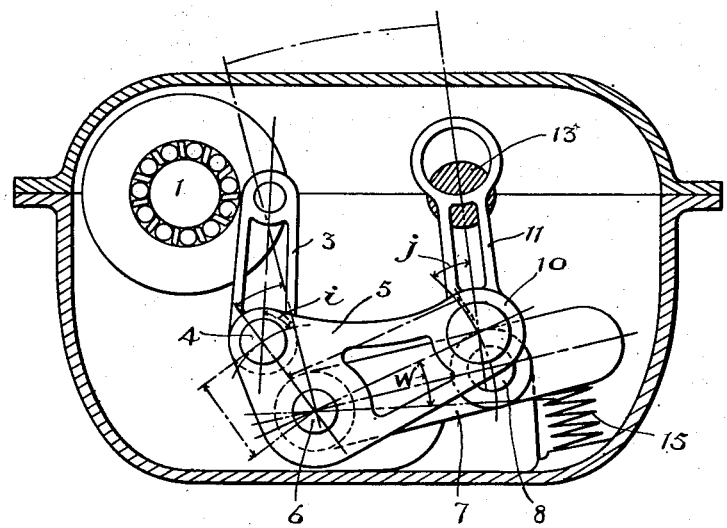

Figure 2 is a sectional diagram illustrating a modified form.

In the structure illustrated the driven shaft 1 is rotated in one direction by a suitable free wheel clutch 2 and to this clutch is connected a link 3.

The link 3 is pivotally connected at 4 to an oscillatable lever 5, the pivotal support 6 of which is adjustable, it being carried upon the lever 7 which in turn is carried on a pivot support 8 arranged within the casing 9 supporting the mechanism.

The free end 10 of the lever 5 is pivotally connected to a connecting rod or link 11 which is operated by a crank 12 connected to the driving shaft 13.

It will be seen that as the driving shaft rotates the link 11 swings the lever 5 through an arc of the angle W, consequently the link 3 operates the clutch to drive the driven shaft. If, however, the relative position of the levers 7 and pivot point 6 is altered the length of movement of the link 3 will be altered and a variation in the speed of movement of the driven shaft will be effected.

This variation of the location of the pivot support 6 of the lever 5 may be effected in various ways and may be automatically governed in accordance with the torque of the driven shaft through the medium of a resilient medium, here illustrated diagrammatically in the form of a spring 14 (see Figure 1) arranged between the casing 9 and the lever 7 intermediate of its length.

In the modification shown in Figure 2 the lever 7 is shown pivoted intermediate of its length and the lever 5 is pivoted intermediate of its length on the pivot 6 at one end. The driving link 11 is pivotally connected to the end 10 at one side of the pivot 6 and the link 3 is connected to the pivot 4 at the other end. The spring 15 is arranged to cooperate with the end of the lever 7 opposite to the floating pivot 6 and it is so proportioned that as the torque of the driven shaft alters the position of the pivot 6 will be altered automatically.

If, for example, the link 11 is inclined at an angle $j$ with respect to the trajectory of the free end 10 of the lever 5 it may be seen that the component of the speed of displacement, relative to its axis, of the body of the link 3 is expressed by the values of the distance between the centres 4 and 6, 6 and 8, the angle $i$ and the angle $j$ and that the driven and drive efforts are in inverse relation, consequently the variation of the angles $i$ and $j$ through the displacement of the axis 6 of oscillation of the swinging member will produce a variation in the transforming of the resisting couples and speeds and such variation may be effected without in any manner disconnecting any of the elements.

This arrangement of mechanism enables a complete automatic adjustment of the equilibrium of the drive and the transmitted forces.

What I claim as my invention is:—

1. A power transmission mechanism, comprising a lever mounted on a fixed pivot, a lever pivotally mounted on the aforesaid lever, a driving crank shaft, a link connecting said crank shaft and said secondary lever, a driven shaft, a free wheel clutch on said driven shaft, a link connecting said free wheel clutch with said secondary lever, and an elastic resisting medium operatively connected with the lever on the fixed pivot to oppose the power stroke of the driving crank in transmitting power to the driven shaft in direct proportion to the torque of the driven shaft.

2. A power transmitting mechanism as claimed in claim 1 in which the elastic resisting medium for resisting the applied power constitutes a spring arranged in direct opposition to the swing of the first mentioned lever carried on the fixed pivot, the force of said spring being applied in tangential relation to the pivot.

3. A power transmission mechanism, comprising, driving and driven shafts parallelly disposed and arranged substantially in the same horizontal plane, a lever mounted on a fixed pivot below said shafts and carrying a pivot at one end arranged in sustantially tangential alignment wth the point of driving connection to the driven shaft, a free wheel on the driven shaft, a link connected to said free wheel, a rocker member pivoted on the pivot carried by said lever and pivoted to said link at a point adapted to swing toward and close to the tangent line between the pivot of the rocker member and the point of connection to the free wheel, a crank on the drive shaft, a connecting rod extending from said crank and pivotally connected to said rocker member in substantially right angular relation to the line of direction intersecting the point of connection of the link and the pivot support of the rocker member, and a compression spring opposing the tilting movement of the lever in the power stroke of the crank.

DIMITRI SENSAUD DE LAVAUD.